(12) United States Patent
Eccarius et al.

(10) Patent No.: US 7,927,753 B2
(45) Date of Patent: Apr. 19, 2011

(54) DIRECT OXIDATION FUEL CELL AND METHOD FOR OPERATION THEREOF

(75) Inventors: Steffen Eccarius, Pliezhausen (DE); Christian Litterst, Frankfurt (DE); Peter Koltay, Freiburg (DE)

(73) Assignees: Fraunhofer-Gesellschaft zur Forderung der Angewandten Forschung E.V., Munich (DE); Albert-Ludwigs-Universitat-Freiburg, Freiburg (DE)

( * ) Notice: Subject to any disclaimer, the term of this patent is extended or adjusted under 35 U.S.C. 154(b) by 39 days.

(21) Appl. No.: 12/169,187

(22) Filed: Jul. 8, 2008

(65) Prior Publication Data
US 2009/0017357 A1     Jan. 15, 2009

Related U.S. Application Data

(63) Continuation of application No. PCT/EP2007/000518, filed on Jan. 22, 2007.

(30) Foreign Application Priority Data

Jan. 20, 2006   (DE) .......................... 10 2006 002926

(51) Int. Cl.
  *H01M 8/10*   (2006.01)
  *H01M 8/06*   (2006.01)
  *H01M 4/90*   (2006.01)

(52) U.S. Cl. ........ 429/455; 429/443; 429/447; 429/454; 429/456; 429/457; 429/462; 429/506; 429/514; 429/516; 429/534

(58) Field of Classification Search .................. 429/443, 429/447, 544, 545, 546, 457, 462, 506, 514, 429/516, 534
See application file for complete search history.

(56) References Cited

U.S. PATENT DOCUMENTS

| | | | |
|---|---|---|---|
| 6,555,261 B1 * | 4/2003 | Lewinski et al. | 429/513 |
| 6,921,603 B2 * | 7/2005 | Morse et al. | 429/442 |
| 7,655,341 B2 * | 2/2010 | Strobel et al. | 429/439 |

(Continued)

FOREIGN PATENT DOCUMENTS

DE    10136755    2/2003

(Continued)

OTHER PUBLICATIONS

The American Heritage Dictionary of the English Language, 2007, [online], [retrieved on Aug. 4, 2010], Retrieved from Credoreference using Internet <URL: http://www.xreferplus.com/entry/hmdictenglang/microstructure>.*

(Continued)

*Primary Examiner* — Ula C Ruddock
*Assistant Examiner* — Amanda Barrow
(74) *Attorney, Agent, or Firm* — Gauthier & Connors LLP

(57) ABSTRACT

The invention relates to a method for operating a direct oxidation fuel cell in which at least one fluid fuel is transported from a fuel reservoir via a fluid distribution structure to a membrane electrode assembly, the transport of the fuel being effected passively, i.e. without convection. Furthermore, the invention relates to a corresponding direct oxidation fuel cell.

11 Claims, 5 Drawing Sheets

U.S. PATENT DOCUMENTS

Figure 1:
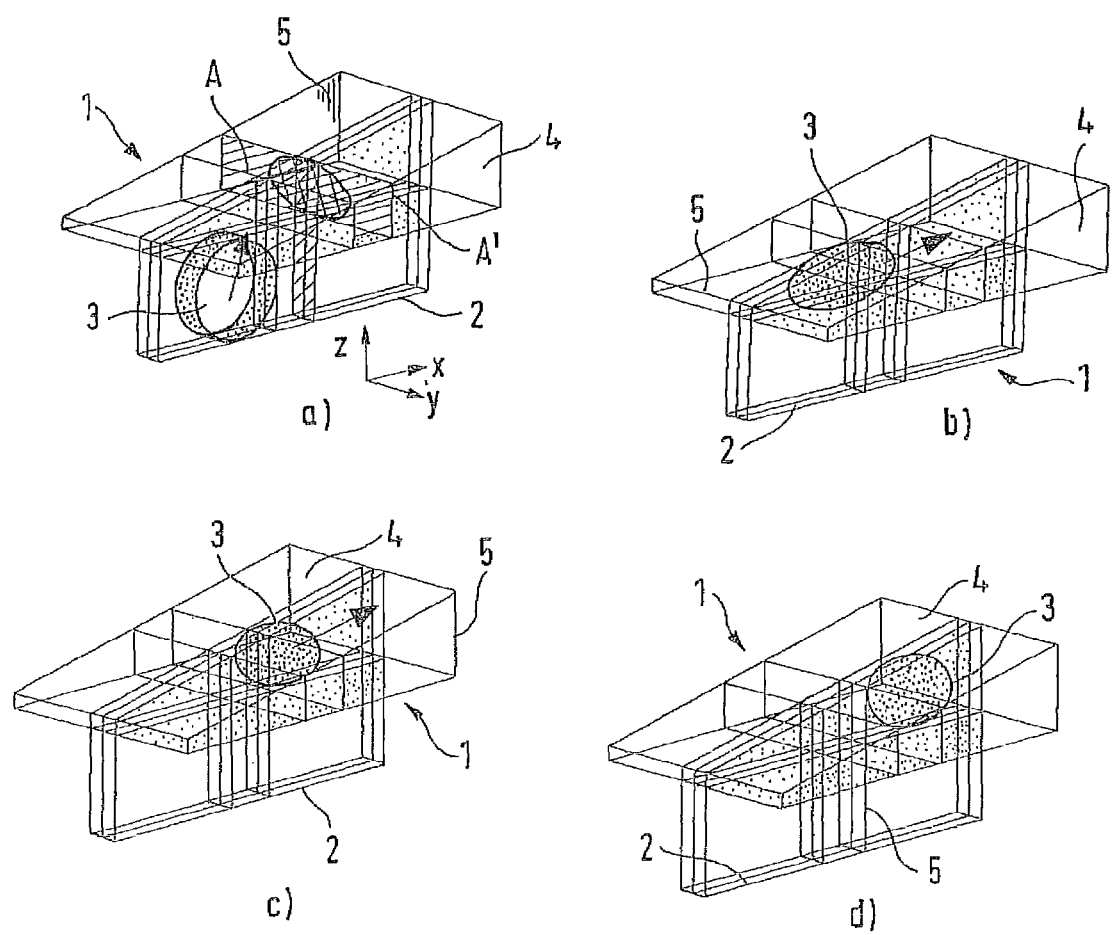

| | | | |
|---|---|---|---|
| 2002/0132151 A1* | 9/2002 | Choi | 429/32 |
| 2002/0172853 A1* | 11/2002 | Kamo et al. | 429/34 |
| 2002/0197522 A1* | 12/2002 | Lawrence et al. | 429/34 |
| 2004/0062980 A1* | 4/2004 | Ren et al. | 429/39 |
| 2004/0151966 A1* | 8/2004 | Dahlgren et al. | 429/34 |
| 2005/0089743 A1 | 4/2005 | Lee | |
| 2005/0170224 A1 | 8/2005 | Ren et al. | |
| 2005/0196666 A1 | 9/2005 | Gottesfeld et al. | |
| 2006/0003196 A1* | 1/2006 | Kohno et al. | 429/12 |

FOREIGN PATENT DOCUMENTS

| | | |
|---|---|---|
| EP | 1513210 | 3/2005 |
| EP | 1513213 | 3/2005 |
| JP | 2003077505 | 3/2003 |
| JP | 2004152561 | 5/2004 |
| JP | 2005129261 | 5/2005 |
| JP | 2005135811 | 5/2005 |
| JP | 2005235519 | 9/2005 |
| WO | 2004032258 | 4/2004 |

OTHER PUBLICATIONS

German Office Action mailed on Sep. 29, 2006 corresponding to German Application No. 102006002926.7, filed on Jan. 20, 2006.

English translation of International Preliminary Report on Patentability from corresponding PCT Application No. PCT/EP2007/000518.

German Office Action cited in German priority Application No. 102006002926.7-45, mailed on Nov. 13, 2008.

\* cited by examiner

DIRECT OXIDATION FUEL CELL AND METHOD FOR OPERATION THEREOF

PRIORITY INFORMATION

The present invention is a continuation of PCT Application Serial No. PCT/EP2007/000518 filed on Jan. 22, 2007, that claims priority to German Application No. 102006002926.7, filed on Jan. 20, 2006. Both applications are incorporated herein by reference in their entireties.

BACKGROUND OF THE INVENTION

The invention relates to a method for operating a direct oxidation fuel cell in which at least one fluid fuel is transported from a fuel reservoir via a fluid distribution structure to a membrane electrode assembly, the transport of the fuel being effected passively, i.e. without convection. Furthermore, the invention relates to a corresponding direct oxidation fuel cell.

The energy requirement of electrical small consumers (PDA, mobile phone etc.) is constantly increasing. However whilst microprocessors have become approx. thirty times faster in the past ten years, the energy density of batteries has merely doubled. The fuel cell is regarded in this context as a possible replacement or as a supplement for conventional batteries and accumulators. In particular direct oxidation fuel cells (e.g. direct methanol fuel cells) are seen as particularly promising mobile energy sources since the liquid fuel cell can be handled comparatively easily and generally has an energy density higher by a multiple than batteries or accumulators.

One of the essential challenges for operation of a direct oxidation fuel cell resides in the production of carbon dioxide bubbles during the oxidation of the carbon-containing, liquid fuel at the anode-side. There may be mentioned as example the oxidation of methanol with the help of water: $CH_3OH + H_2O \rightarrow CO_2 + 6 H^+ + 6 e^-$. These bubbles can become fixed within the gas diffusion layer or in the fluid distribution structure and thus reduce the active cell surface and the performance of the fuel cell.

In a standard mode of operation, a pump which provides the direct oxidation fuel cell with liquid fuel is operated continuously. The gas bubbles are dissolved in liquid with the generally superstoichiometric volume flow or are rinsed out of the fuel cell with the liquid and are separated in a subsequent step from the liquid fuel. This requires continuous operation of the pump which is accompanied by fairly large power requirements of the pump and consequently reduces the efficiency of the system of the entire fuel cell system.

Starting from the state of the art of continuously operated systems, it was the object of the present invention to improve the operation of direct oxidation fuel cells such that a higher system efficiency of the fuel cell can be achieved. In addition, a system was intended to be provided by means of which the so-called cross-over of fuel, i.e. the penetration of unconsumed fuel through the membrane, is prevented.

This object is achieved by the generic method having the characterising features of claim 1 and the generic direct oxidation fuel cell having the characterising features of claim 15. The further dependent claims reveal advantageous developments.

SUMMARY OF THE INVENTION

According to the invention, a method for operating a direct oxidation fuel cell is provided in which at least one fluid fuel is transported from a fuel reservoir via a fluid distribution structure to a membrane electrode assembly. The present invention is distinguished in that the transport of the at least one fluid fuel is effected without convection in that the transport is based solely on the diffusion of the fuel and on at least one further fluid.

With the help of the method according to the invention, an active, i.e. convective, fuel supply, for example with the help of a pump, can be entirely dispensed with. By exact adjustment of the diffusion path, it is made possible according to the invention that the optimum fuel concentration at the membrane can be adjusted. In this way, the so-called cross-over of fuel, i.e. the penetration of unconsumed fuel through the membrane, can be minimized. Because of the fact that an active component, such as e.g. a pump, can be dispensed with, the method according to the invention confers the substantial advantage that the efficiency of the direct oxidation fuel cell can be significantly increased relative to the methods known from the state of the art.

Preferably, the at least one further fluid in the process according to the invention is at least partially electrochemically recycled. For example in the case of a DMFC, methanol is reacted with water to form $CO_2$ on the anode-side. On the cathode-side, the consumed water is then recycled again electrochemically.

A preferred variant of the method according to the invention provides that the fuel cell has a perforated diaphragm and/or porous membrane which is connected to a fuel reservoir. However, all structures with regularly disposed openings can also be used here. Thus the fuel can pass from the reservoir up to the holes or pores. The diameter of the holes and/or pores is thereby chosen such that a diffusion which is adequate for the electrochemical reaction and hence transport of the fuel to the membrane electrode assembly is ensured.

The passive fuel supply, i.e. a supply without convective transport, is thereby a function of various parameters. The concentration of fuel prevailing at a specific location can be calculated by means of a diffusion equation. This is intended to be clarified in the example of a direct methanol fuel cell (DMFC), in which methanol is used as fuel. In this case, the fuel cell has a perforated diaphragm or porous membrane at a spacing d from the membrane electrode assembly. A one-dimensional stationary diffusion model which is based on a point source and a sink at a spacing d serves as the basis for the calculation. This is clarified with reference to FIG. 6. In order to be able to calculate the diameter of the required holes or pores, the surface area thereof is approximated with $a = r^2$ and the surface area of the portion of the membrane electrode assembly to be supplied ("sink"), with a spherical cap $A = 2 d^2$.

The diffusion equation thereby results as:

$$A\Phi = D\Delta C$$

$\Phi$ hereby represents the methanol consumption and $\Delta C$ the concentration difference. Calculation thereof is effected according to the following equations:

$$\Phi = \frac{j}{\eta 6 \frac{e^-}{MeOH}} = \frac{6.2410^{17} \frac{e^-}{cm^2 s}}{0.1 \cdot 6 \frac{e^-}{MeOH}} = 1.0410^{18} \frac{MeOH}{cm^2 s}$$

$$\Delta C = \frac{aC_a - AC_A}{d} \text{ in } \left[\frac{MeOH}{cm^2}\right]$$

The source radius r can be determined therefrom:

$$r = \frac{\sqrt{2}\sqrt{C_A d^2 D + d^2 \Phi}}{\sqrt{C_a}\sqrt{D}}$$

The parameters hereby have the following meaning:
d=spacing between hole or pore and membrane electrode assembly
Φ=fuel consumption of the fuel cell
$C_A$=concentration of the fuel at the membrane electrode assembly
$C_a$=concentration of the fuel at the holes or pores
D=diffusion constant of the fuel in the at least one further fluid
j=electrical current density of the fuel cell
η=efficiency of the fuel cell
T=operating temperature of the fuel cell Using the model parameters cited in Table 1, there is produced thus for a spacing d=100 µm a radius for the source of r≈51.5 µm

TABLE 1

| Parameter | Value | Alternative formulation |
|---|---|---|
| d | 100 µm | |
| $C_a$ | 100% | $1.483 * 10^{22}$ MeOH/cm$^3$ |
| $C_A$ | 2 mol | $1.224 * 10^{21}$ MeOH/cm$^3$ |
| η | 10% | |
| j | 0.1 A/cm$^2$ | |
| T | 300K | |
| D | $13.7 * 10$ cm$^2$/s | $D = a \cdot e^{bT}$ |
| | | $a = 43.18 * 10^{-9}$ cm$^2$/s |
| | | $b = 1.92 * 10^{-2}$ 1/K |

It is shown with reference to this simple model calculated with realistic parameters that it is possible to supply DMFCs—and in particular microDMFCs—purely by diffusion. The fuel consumed at the MEA is supplied exclusively by diffusion in the liquid phase. If the supply is dimensioned correctly (here the openings with surface area a) a continuous operation with a constant concentration $C_A$ is made possible.

In concrete terms, such a cell can be produced such that the mixture required for the reaction with concentrations $C_A$ is separated from pure fuel with the concentration $C_a$ by means of a "perforated plate" or a porous structure. The natural diffusion then drives the fuel molecules constantly in the direction of the concentration gradient from $C_a$ to $C_A$. The porous openings, or the holes in the separating wall, then serve as sources, as represented above in the simplified model.

The membrane electrode assembly has the construction known from the state of the art. Thus the latter consists of a proton-conducting membrane, e.g. made of Nafion, and also respectively anode-side and cathode-side catalyst and diffusion layers. The proton-conducting membrane should thereby be impermeable for the fuel and the reaction products.

With respect to the catalyst layers, those materials should be preferred which have a large active surface, resistance to carbon monoxide and as far as possible no subsidiary reactions or byproducts. For particular preference, catalyst layers thereby comprise platinum, ruthenium and/or alloys thereof.

The diffusion layers are intended to enable transport of the fuel to the anodic catalyst layer and or of the further educt to the cathodic catalyst layer. In addition, the diffusion layer must enable transport of the gaseous reaction products from the anodic catalyst layer or of the reaction products from the cathodic catalyst layer. A further requirement of the diffusion layer concerns the property thereof to conduct electrons.

Instead of the diffusion layers, also microstructures can be used.

A further preferred variant of the method according to the invention provides that degassing of the liquid fuel is effected in addition in the fuel cell. A variant of this provides microstructuring of the fluid distribution structure, by means of which the transporting away of gaseous media from the fluid distribution structure is assisted. Reference is made to FIGS. 1 to 4 with respect to this variant.

Figure 5:
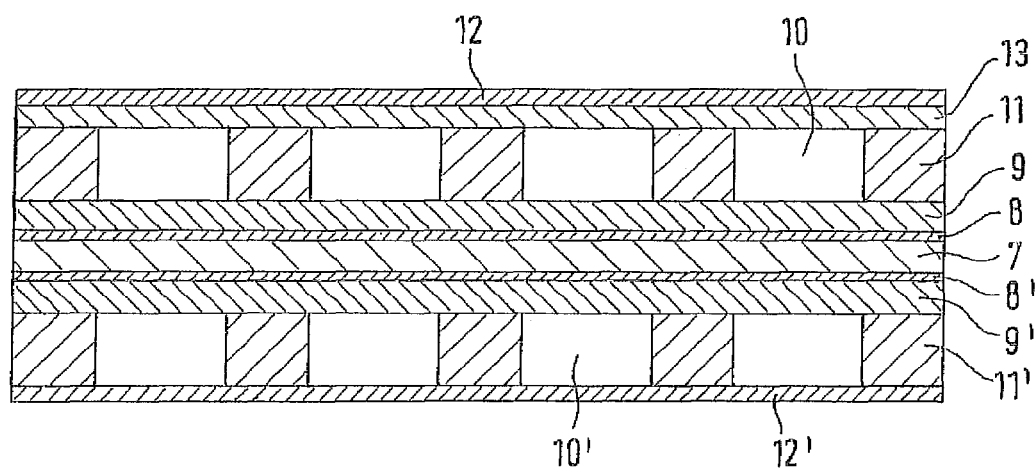

Another variant for degassing provides that the fuel cell has, on the anode-side, at least one barrier layer which is impermeable for gases and for liquids. As a result, the liquids can be retained in the fluid distribution structure and the gases transported away from the fluid distribution structure. Reference is made to FIG. 5 with respect to this variant. The barrier layer is thereby preferably an oleophobic membrane. Likewise, microstructures or ceramics can however also be used as barrier layer. With respect to the arrangement of the barrier layer, a first preferred variant provides that the latter is disposed between the anode-side end plate which is located on the side of the fluid distribution structure orientated away from the MEA and the anode-side fluid distribution structure. Another preferred variant provides that the barrier layer is disposed on the side of the anode-side end plate which is orientated away from the anode-side fluid distribution structure. The end plate preferably has degassing holes.

The subject according to the invention is intended to be explained in more detail with reference to the subsequent Figures without wishing to restrict said subject to the special embodiments shown here. There are shown:

DETAILED DESCRIPTION OF THE ILLUSTRATED EMBODIMENTS

Figure 2:
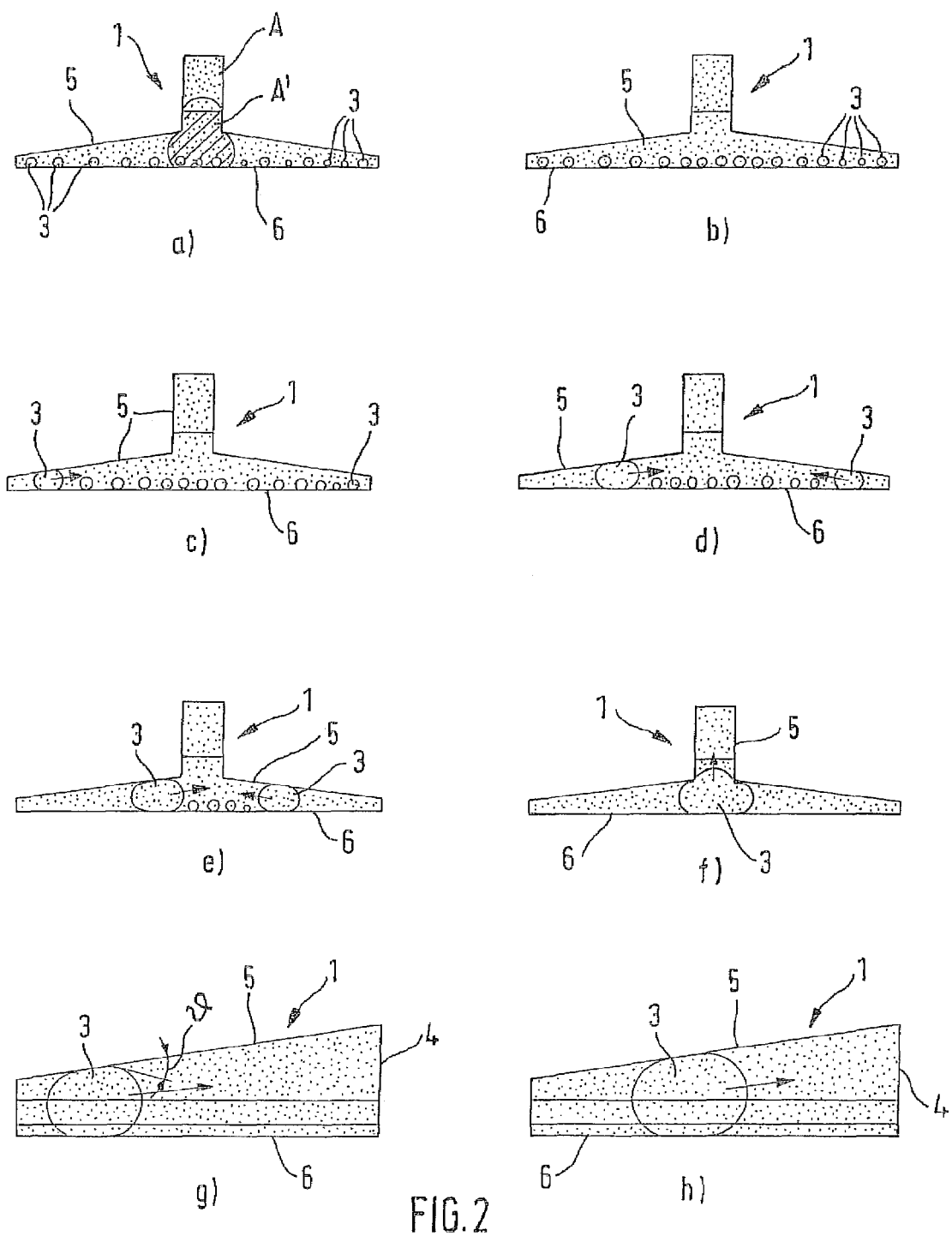
Figure 3:
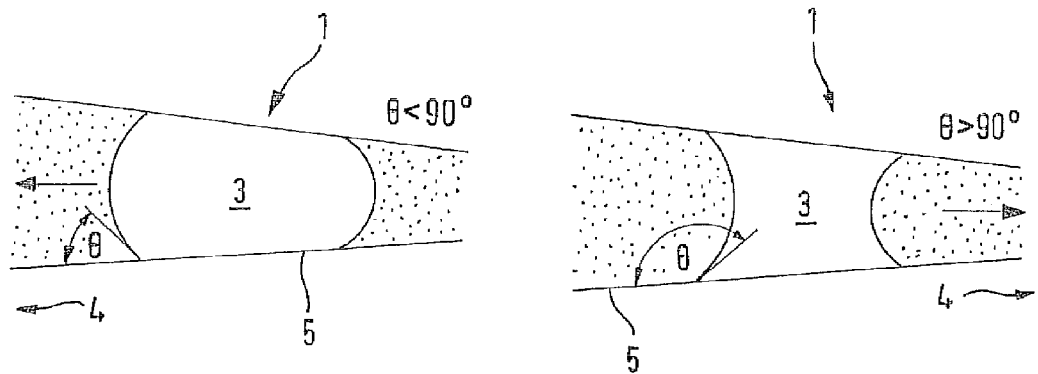
Figure 6:
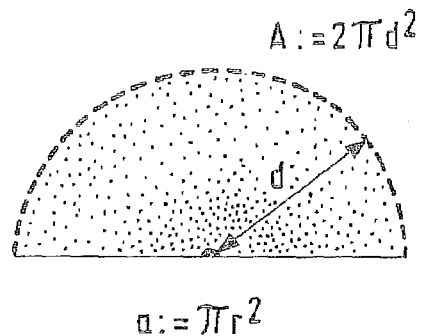
Figure 7:
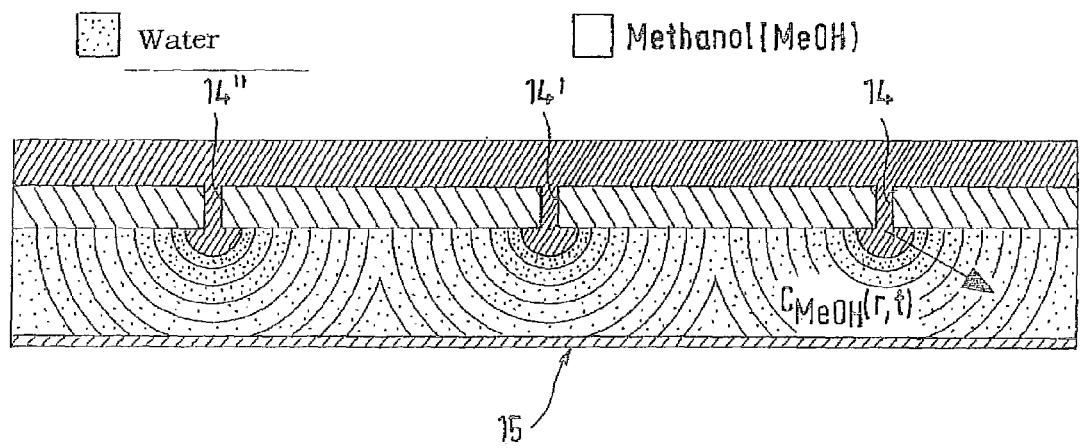
Figure 8:
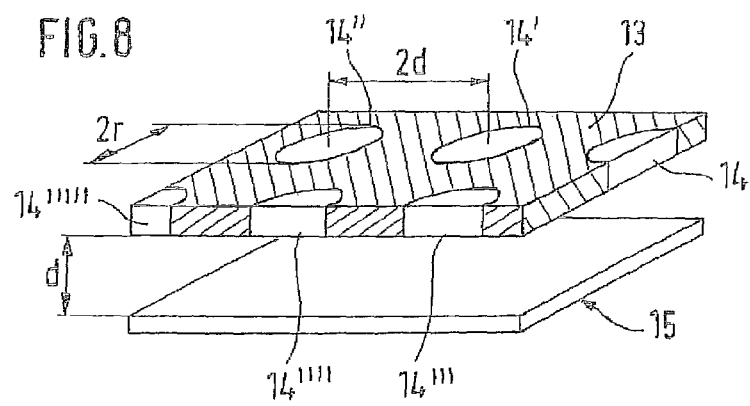

FIG. 1 a perspective view of a channel portion from a device for removing gaseous components in the form of a microstructure with an inclusion at four successive points in time, FIG. 2 a cross-section through a channel in another embodiment of the microstructure with inclusions at six successive points in time and also a side view of the same channel with an inclusion at two successive points in time, FIG. 3 respectively a longitudinal section through a channel comprising two different embodiments of the micro structure and FIG. 4 again respectively a longitudinal section through two channels of further embodiments, FIG. 5 schematically the construction of a variant according to the invention relating to the degassing of the fuel cell, FIG. 6 a model for determining the surface area of the source according to the underlying diffusion model, FIG. 7 the diffusive dilution of the fuel in the further fluid in the example of a direct methanol fuel cell (DMFC) with reference to a schematic representation, FIG. 8 schematically, the construction of a fuel cell according to the invention with the values derived from the diffusion models.

The same channel 1 is illustrated four times in FIG. 1, said channel being integrated into a chemical microreactor, itself not illustrated, and is disposed there with a lateral surface 2 situated respectively at the bottom in the Figure abutting against a catalytic membrane. The channel 1 conducts a flowable medium which involves a liquid in the present case. In accordance with requirements, operation of the chemical microreactor involves formation of gas on the catalytic membrane which enters into the channel 1 on the lateral surface 2 and forms bubbles there. An inclusion 3 formed by such a bubble is represented in FIG. 1 in the illustrations characterised with a), b), c) and d) at four successive times, illustration b) reproducing a time after that shown in illustration a) of 0.000755 s, illustration c) after 0.001175 s and illustration d) after 0.00301 s.

In the case of different, similarly designed devices, the inclusions 3 can be formed also by a fluid which can be distinguished from the medium conducted through the channel 1. It would also be possible that each flowable medium were present not as liquid but as a gas. In the case described here, the flowable medium concerns a liquid reactant which is supplied to the channel 1 from an end situated in FIG. 1 respectively on the left. At one end of the channel 1 which is illustrated situated respectively on the right in FIG. 1, the latter has an open-ended channel outlet 4, through which the gas forming the inclusion 3 can escape into the surroundings of the microreactor.

The channel 1 has a cross-section which forms a T-profile, the lateral surface 2 terminating a further bar which protrudes from a transverse bar of the T-profile. Because of capillary forces which effect minimization of a surface energy of the inclusion 3, the inclusion 3 formed on the lateral surface 2 initially rises up to a position at which the mentioned further bar touches the traverse bar, as a result of which the inclusion 3 is removed from the catalytic membrane abutting against the lateral surface 2.

In addition, the channel 1 now has a geometry which forces the inclusion 3 into a form in which again capillary forces act upon it, which forces move the inclusion 3 along the channel 1 to the channel outlet 4. This geometry is characterised in that a ratio $A'/l'$ and a ratio $A/l$ along the channel 1 to the channel outlet 4 increase strictly monotonically and constantly, there being defined for each cross-section of the channel 1 which is perpendicular to a longitudinal direction of the channel 1 the value A as area and the value l as circumferential length of this cross-section, whilst there may be termed with $A'$ an area and with $l'$ a length of a circumferential line of a coherent surface situated within this cross-section, this surface being defined in that $A'/l'$ compared with all other coherent surfaces situated in the cross-section assumes a maximum value, $\theta$ being defined as wetting angle which is set at the level of the respective cross-section on the channel wall 5 between the flowable medium conducted by the channel 1 and the gas forming the inclusions 3 (or liquid fluid in other embodiments of the invention) and is situated completely in the first-mentioned flowable medium. In the present example, $\theta < l/2$ applies so that in particular sine(cos $\theta$)=+1 applies and hence also the values sine(cos $\theta$)$A'/l'$ and sine (cos $\theta$)$A/l$ increase strictly monotonically and constantly along the channel 1 towards the open-ended channel outlet 4.

The monotonic increase in the mentioned values or ratios along the channel 1 towards the channel outlet 4 is achieved in the present case in that the area A of the cross-section of the channel 1 and hence also the area $A'$ of the surface situated within the cross-section which corresponds in a good approximation to the surface area which an inclusion 3 strives to assume within the cross-section, increases monotonically along the channel. An increase in those surface areas A and $A'$ along the channel 1 is thereby achieved in that a dimension of the cross-section is configured to be monotonically increasing in a direction along the channel 1 perpendicular to the transverse bar of the mentioned T-profile, which is achieved by a stretch, increasing in the course of the channel 1, of a part of the T-profile forming the transverse bar in the direction perpendicular to the transverse bar and a therewith associated profile change. The part of the channel 1 forming respectively the transverse bar of the T-profile consequently obtains a wedge shape. Other geometries of the channel 1 would also be conceivable, in which a largest diameter of the cross-section of the channel 1 and/or a dimension of this cross-section increases monotonically along the channel 1 in a direction perpendicular to that diameter in order consequently to induce a movement of inclusions 3 in a preferred direction by means of capillary forces. In the present case of the channel 1 from FIG. 1, a profile change is produced in the described manner in which a ratio defined as $A/l^2$ and one as $A'/l'^2$ also increases along the channel 1 towards the channel outlet 4 strictly monotonically and constantly.

Finally, it would also be possible to configure the channel wall 5 of the channel 1 alternatively or additionally to a profile change with surface properties which change along the channel, for example by means of a location-dependent coating, so that the wetting angle $\theta$, which is a function of the gas forming the inclusions 3 of the flowable medium conducted by the channel 1 and of the surface properties of the channel wall 5, has a value which changes along the channel 1 and that the inclusions 3 are consequently brought into a shape which causes or increases the capillary forces which move the inclusions 3 towards the channel outlet 4.

The channel illustrated in FIG. 1, not to scale, is dimensioned furthermore such that the area A of the cross-section of the channel 1 has a value of 25,000 $\mu m^2$ at a channel start and increases over a stretch of a length of 0.7 mm along the channel 1 uniformly to a value of 95,000 $\mu m^2$ at the channel outlet 4. The channel 1 thereby has a width of 500 $\mu m$ which is given by a length of the transverse bar of the mentioned T-profile and is constant in the present case. A corresponding configuration of a capillary in which a cross-sectional change is achieved merely by tilting at least one of the channel walls 5 by only approx. 0.001° would also be possible.

During operation of the microreactor which contains the illustrated channel 1, the inclusions 3, one of which is illustrated in FIG. 1, are produced on the lateral surface 2, the gas forming the inclusions 3 having an unequivocally fixed chemical composition as a result of the reaction taking place, due to the device, on the lateral surface 2 or on the catalytic membrane abutting thereon. Hence the wetting angle $\theta$ used previously to describe properties of the channel 1 is also fixed. Because of the described geometry of the channel 1, the inclusions 3 are now moved towards the channel outlet 4 driven exclusively by capillary forces.

Capillaries, which conduct flowable media, of the type of the previously described channel 1 can also be provided in other devices, apart from chemical microreactors, in particular for the purpose of degassing or removing other inclusions, for example in devices which contain refillable liquids and in which refilling is typically associated with formation of bubbles. Refillable ink cartridges may be mentioned as an example.

A similar channel 1 which serves to transport a liquid reactant in a bipolar plate of a fuel cell stack and has similar dimensions to the previously described channel 1 is represented in FIG. 2 as cross-section (illustrations a) to f)) and as side view (illustrations g) and g)). The fuel cell stack which is itself not illustrated comprises, in the present case, direct methanol fuel cells, the illustrated channel 1 serving primarily for transporting methanol which forms the mentioned reactant.

The channel 1 again has a cross-section forming a T-profile, a transverse bar of this T-profile which is situated at the bottom respectively in FIG. 2 abutting against a diffusion layer which serves as catalyst and, for its part, abuts against an electrolyte membrane. This diffusion layer forms an active surface 6 on which, during operation of the fuel cell stack, gaseous carbon dioxide is produced, which forms inclusions 3 surrounded by methanol within the channel 1. The transverse bar of the T-profile has a shape which tapers towards two ends, a further bar which points away from the active surface 6 protruding in the centre on the transverse bar. The illustrations in FIG. 2, characterised by a) to f), illustrate that this form of the T-profile has the result that the growing inclusions 3 move towards the mentioned further bar because of capillary forces, larger inclusions 3 absorbing within themselves any smaller inclusions 3 encountered on the way. In the case of other embodiments of the invention, it can be provided that the mentioned further bar which begins in the centre on the transverse bar of the T-profile, widens away from the transverse bar, as a result of which movement of the inclusions 3 can be induced because of capillary forces into the further bar of the T-profile and hence away from the active surface 6. In a similar manner, the channel 1 could be configured, in a modification of the invention, also with an L-profile (this would be produced by omitting one half of the transverse bar) with a member abutting against the active surface 6.

As in the previously described example, the channel 1 illustrated in FIG. 2 also has a cross-section A which increases along the channel 1 towards a channel outlet 4 constantly and strictly monotonically, a ratio defined as A/l increasing also towards the channel outlet 4 constantly and strictly monotonically, l being defined as the circumferential length of the cross-section of the channel 1. The inclusions 3 form, with a channel wall 5, a wetting angle or contact angle θ with a smaller value of between 0 and /2, for which reason the mentioned increase in the ratio A/l and the therewith associated increase in the ratio A'/l' (A' and l' may be defined as explained previously in connection with FIG. 1) has the result that capillary forces which move the inclusions 3 towards the channel outlet 4 act on said inclusions. The increase in cross-section A and a movement of an inclusion 3 towards the channel outlet 4, induced in the described manner, is illustrated in the illustrations g) and h) which reproduce two successive points in time. The wetting angle θ is illustrated also at one position there.

Similarly to the channel 1 described here, a coolant channel can also be configured which conducts a liquid coolant and in which vapour bubbles of the coolant can be formed during operation of the fuel cell stack or of another chemical microreactor. Corresponding channels 1 can be disposed not only in bipolar plates but also in other current consumers, for example of fuel cells.

Figure 4:
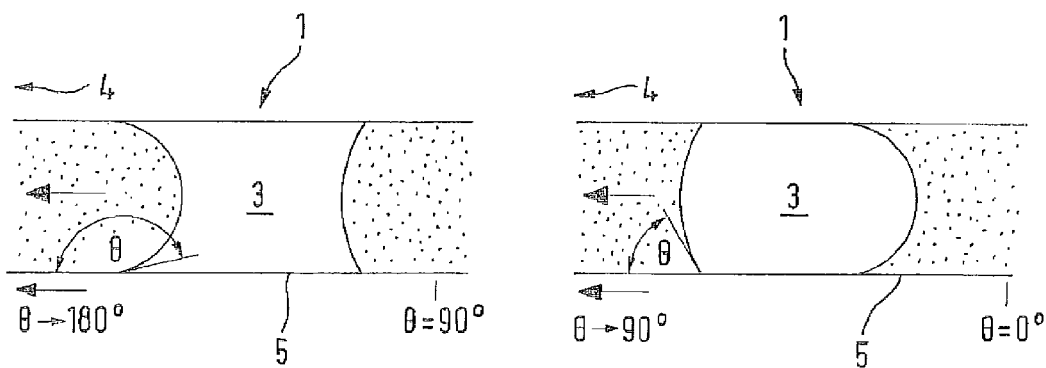

FIGS. 3 and 4, in which recurring features are again characterised with the same reference numbers, illustrate once again the described effects of bubble transport which can be attributed to capillary forces. In FIG. 3 on the left, a channel 1 with an inclusion 3 of a fluid which is enclosed to the right and left by a flowable medium is shown. The contact angle θ which is defined as situated completely in the flowable medium outwith the inclusion 3 is smaller here than/2 so that an increase of A/l (and A'/l') towards the channel outlet 4 (here to the left) effects transport of the bubbles in this direction. In the same FIG. 3, another channel 1 from another device is illustrated on the right, in which inclusions 3 are formed in a similar manner, in the case of which however a contact angle θ is set which is greater than π/2. A reduction of A/l (and A'/l') towards the channel outlet 4 (now situated on the right) has the effect here that the inclusions 3 are moved thereto.

FIG. 4 illustrates, in two examples, on the left for θ>π/2 and on the right for θ<π/2, how a corresponding effect is achieved even with a constant channel cross-section by means of location-dependent values of θ. In both cases, an increase of θ towards the channel outlet 4 (respectively situated on the left) effects a force which acts on the respective inclusion 3 moves the latter towards the channel outlet 4. In all the portrayed cases, the movement is produced by different capillary pressures on the two oppositely situated ends of the respective inclusion 3, which is reflected in different curvatures of the menisci delimiting the inclusions. This effect is caused, in the examples of FIG. 3, by the channel geometry, in the examples of FIG. 4 by a location-dependent contact angle θ which can be achieved by a surface coating of the channel wall 5 which changes along the channel 1. Of course the effects described with reference to FIGS. 3 and 4 can also be superimposed (by combination of the features).

With the present microstructure, it is proposed moreover in particular to use geometric structures for the transport of gas bubbles in that the geometry of fluid-conducting channels 1 is configured in accordance with the respective requirements. If for example a lateral wall 2 of the channel 1 is formed by a membrane on which a reaction takes place and for example produces gas which is intended to be discharged as rapidly as possible, then the channel geometry can be configured such that the gas is transported away from the membrane solely due to capillary forces. Structures of the type presented here can therefore be used for passive transporting away of gas volumes, the channels 1 prescribing a preferred direction and being able to be used for passive transport even over fairly long stretches. For discharge of the gas bubbles, no externally acting forces and hence no corresponding external components, such as for example pumps, are thereby required. FIGS. 1 and 2 are based on numerical flow simulations and show how gas volumes which form the inclusions 3 are moved respectively into a specific section of a cross-section because of minimisation of surface energies and are forced there into a movement along the channel 1 as a result of different capillary pressures. This movement typically lasts until detachment of the corresponding gas volume from the channel walls 5 at a channel outlet 4 since then an energy minimum is achieved.

It is therefore proposed in particular to use passive systems of the type described here for transport of a phase which forms inclusions 3 (typically gas) in chemical reactor systems. Typical reactors which are suitable for using such structures are catalytic reactors, such as for example fuel cells with catalytic membranes on which gas bubbles are produced continuously. By means of rapid transporting away of the gas bubbles, blockage of an active membrane surface is consequently prevented, in that this membrane surface is kept clear. In addition, the resulting gas bubbles automatically ensure, with the help of the special adapted geometry of the channels 1, typically periodic cleaning of the membrane surface by gas bubbles. This method ensures a maximum free reaction surface, ensures automatic refilling of the reactor with the corresponding reactants and hence offers great advantages relative to the state of the art.

The geometric structures, by means of which the desired capillary forces for passive transport of the phase which forms the bubbles are caused, can also comprise webs and tapers or be achieved by those. The geometry is thereby intended to be created such that the phase which forms bubbles is moved in a preferred direction—driven by surface tension of the resulting bubbles—because of the geometry and because of surface features of the geometric structures, transport of the bubbles being effected typically exclusively passively, i.e. driven merely by the capillary forces at phase boundaries.

In FIG. 5, the construction of a variant according to the invention concerning the degassing of the fuel cell is represented. This is based on a membrane electrode assembly (MEA) with a proton-conducting membrane 7, against which catalyst layers 8 and 8' and also gas diffusion layers 9 and 9' abut on the anode-side and cathode-side. On the anode-side, a fluid distribution structure 10 with associated current collectors 11 is disposed adjacently. In the same manner, the cathode-side has a fluid distribution structure 10' with current collectors 11'. Respective end plates 12 and 12' form the seal on both sides, in addition a gas-permeable but liquid-impermeable barrier layer, e.g. an oleophobic membrane, being disposed on the anode-side. With the help of this barrier layer 13, the fuel is retained in the fluid distribution structure, whilst the carbon dioxide produced in the case of the oxidation of methanol can escape into the surroundings. The arrangement of the barrier layer is not compulsory since the latter can also be applied externally on the end plate 12.

In FIG. 6, it is illustrated schematically how the surface of the source, i.e. of the holes or pores, must be chosen in order to ensure the desired concentration $C_A$ at a spacing d from the source. In order to be able to calculate the diameter of the required source, the surface thereof is approximated with $a=\pi r^2$, the surface of the portion of the membrane electrode assembly to be supplied as sink, with a spherical cap $A=2\pi d^2$.

In FIG. 7, the concept according to the invention is represented by means of a direct methanol fuel cell (DMFC). The fuel cell hereby has a structure 13, e.g. in the form of a membrane, with a large number of openings 14, 14' and 14". The structure is thereby connected to a fuel reservoir so that the fuel can diffuse through the openings 14, 14' and 14" into the fluid distribution structure which is filled with water in the present case. The diffusion is now adjusted such that the desired fuel concentration is ensured at the membrane electrode assembly 15.

In FIG. 8, the construction of a fuel cell according to the invention is represented schematically. The structure provided with openings 14 to 14"" is thereby disposed at a spacing d from the membrane electrode assembly 15. The spacing between the individual openings is hereby 2d. The diameter of the openings is 2r.

What is claimed is:

1. A direct oxidation fuel cell in which the transport of at least one fuel is effected passively, containing a membrane electrode assembly with an anode and cathode and also at least one anode-side and one cathode-side fluid distribution structure in which the anode-side distribution structure is connected to a fuel reservoir, wherein the fuel cell has a perforated diaphragm and/or porous membrane connected to the fuel reservoir, via a hole or pore diameter of which transport of the fuel to the membrane electrode assembly by means of diffusion can be controlled, wherein the anode-side fluid distribution structure has at least one channel with a T-shaped cross-section, the channel being integrated into a chemical microreactor that is disposed within a bipolar plate or abuts against a diffusion layer.

2. The direct oxidation fuel cell according to claim 1, wherein the diameter r of the holes and/or pores is determined by the following equation:

$$r = \frac{\sqrt{2}\sqrt{C_A d^2 D + d^2 \Phi}}{\sqrt{C_a}\sqrt{D}}$$

with
 d=spacing between hole or pore and membrane electrode assembly
 $\Phi$=fuel consumption of the fuel cell
 $C_A$=concentration of the fuel at the membrane electrode assembly
 $C_a$=concentration of the fuel at the holes or the pores
 D=diffusion constant of the fuel in the at least one further fluid.

3. The direct oxidation fuel cell according to claim 2, wherein the fuel consumption $\Phi$ is determined by the following equation:

$$\Phi = \frac{j}{6\eta}$$

with
 j=electrical current density of the fuel cell
 $\eta$=efficiency of the fuel cell.

4. The direct oxidation fuel cell according to claim 1, wherein the membrane electrode assembly consists of a proton-conducting membrane and also respectively anode-side and cathode-side catalyst layers and diffusion layers.

5. The direct oxidation fuel cell according to claim 1, wherein the membrane electrode assembly consists of a proton-conducting membrane and also respectively anode-side and cathode-side catalyst layers and microstructures.

6. The direct oxidation fuel cell according to claim 5, wherein the proton-conducting membrane is impermeable for to the fuel and the reaction products.

7. The direct oxidation fuel cell according to claim 5, wherein the catalyst layers comprise platinum, ruthenium and/or alloys thereof.

8. The direct oxidation fuel cell according to claim 1, wherein the fuel cell has in addition a device for removing gaseous components of the liquid fuel.

9. The direct oxidation fuel cell according to claim 8, wherein the degassing device is present in the form of a microstructure of the anode-side fluid distribution structure which assists the transporting away of gaseous media from the anode-side fluid distribution structure.

10. The direct oxidation fuel cell according to claim 1, wherein the fuel cell, on the anode-side, has at least one barrier which is permeable to gases and impermeable to liquids, as a result of which the liquids are retained in the anode-side fluid distribution structure and the gases can be transported away from the anode-side fluid distribution structure.

11. The direct oxidation fuel cell according to claim 10, wherein the at least one barrier layer consists of an oleophobic membrane.

* * * * *